United States Patent
Storck et al.

(10) Patent No.: US 12,336,538 B2
(45) Date of Patent: Jun. 24, 2025

(54) METHOD FOR CONTROLLING RATS AND MICE WITH CHOLECALCIFEROL BAITS

(71) Applicant: BASF Agro B.V., Arnhem (NL)

(72) Inventors: Thorsten Storck, Dossenheim (DE); Sharon Hughes, Widnes (GB)

(73) Assignee: BASF AGRO B.V., Arnhem (NL)

( * ) Notice: Subject to any disclaimer, the term of this patent is extended or adjusted under 35 U.S.C. 154(b) by 0 days.

(21) Appl. No.: 15/318,814

(22) PCT Filed: Jun. 11, 2015

(86) PCT No.: PCT/EP2015/063071
§ 371 (c)(1),
(2) Date: Dec. 14, 2016

(87) PCT Pub. No.: WO2015/193171
PCT Pub. Date: Dec. 23, 2015

(65) Prior Publication Data
US 2017/0127680 A1 May 11, 2017

(30) Foreign Application Priority Data

Jun. 16, 2014 (EP) .................................... 14172586
Jan. 12, 2015 (EP) .................................... 15150811
Jan. 22, 2015 (EP) .................................... 15152162

(51) Int. Cl.
*A01N 49/00* (2006.01)
*A01N 25/00* (2006.01)
*A01N 25/34* (2006.01)

(52) U.S. Cl.
CPC ........... *A01N 49/00* (2013.01); *A01N 25/004* (2013.01); *A01N 25/34* (2013.01)

(58) Field of Classification Search
CPC ..... A61K 3/1593; A61K 9/0056; A01N 25/00
See application file for complete search history.

(56) References Cited

U.S. PATENT DOCUMENTS

| | | | | |
|---|---|---|---|---|
| 5,135,744 | A * | 8/1992 | Alexander | A01N 25/002 424/409 |
| 6,352,693 | B1 * | 3/2002 | Kawada | A01N 25/006 424/405 |
| 2013/0309287 | A1 * | 11/2013 | Hoyos | A01N 25/004 424/405 |
| 2016/0075493 | A1 * | 3/2016 | Dutzig | B65D 85/70 206/484.2 |

FOREIGN PATENT DOCUMENTS

| | | |
|---|---|---|
| DE | 198 37 064 | 2/2000 |
| EP | 0 392 934 | 10/1990 |
| EP | 2 497 362 | 9/2012 |
| WO | WO-2014/064272 | 5/2014 |
| WO | WO-2014/154621 | 10/2014 |
| WO | WO-2014/177449 | 11/2014 |
| WO | WO-2015/132054 | 9/2015 |
| WO | WO-2015/193171 | 12/2015 |

OTHER PUBLICATIONS

Marshall, 1984, Proceedings of the Eleventh vertebrate Pest Conference, 22, 5 pages.*
7. Lee et al., PeerJ, 2018, 1-22.*
Gould et al., "The Effect of Dextromethorphan in Preventing Cholecalciferol- Induced Poison Shyness and Sickness-Induced Anorexia in the Laboratory Norway Rat," Pest Management Science, 2008, vol. 64, pp. 197-202.
Kocher et al., "Synergistic Effect of Bromadiolone and Cholecalciferol (Vitamin D3) Against House Rat, Rattus rattus," International Journal of Research in BioSciences, 2013, vol. 2, No. 1, pp. 73-82.
Marshall, "Cholecalciferol: A Unique Toxicant for Rodent Control," Proceedings of the Eleventh Vertebrate Pest Conference, 1984, vol. 22, pp. 95-98.
Pospischl et al., "Racumin Plus, A New Promising Rodenticide Against Rats and Mice," Proceeding of the Sixteenth Vertebrate Pest Conference, 1994, vol. 48, No. 1, pp. 180-187.
Saini et al., "Control of Rattus rattus with Cholecalciferol: Laboratory Acceptance of Freshly Prepared and Ready-to-Use Bait Formulations," International Biodeterioation & Biodegradation, 1992, vol. 30, No. 1, pp. 87-96.
Quintox® Rat and Mouse Bait Ready To Use Place Pac, 2004, pp. 1-3.
International Search Report dated Jul. 15, 2015 for PCT/EP2015/063071.

* cited by examiner

Primary Examiner — Kyle A Purdy
(74) Attorney, Agent, or Firm — MARSHALL, GERSTEIN & BORUN LLP

(57) ABSTRACT

The present invention relates to a method for controlling undesired rats and mice comprising the steps of placing on a first day cholecalciferol baits at bait points in an environment to be protected and leaving the baits for a baiting time at the bait points, where the baiting time is less than 10 days for the control of mice and less than 15 days for the control of rats; or where the cholecalciferol baits are placed only on the first day of the baiting time and optionally on up to 3 further times within the baiting time in the environment to be protected.

12 Claims, 2 Drawing Sheets

Fig. 1: Tracking Score (cf. Tables 1-3) indicating the rat population reduction
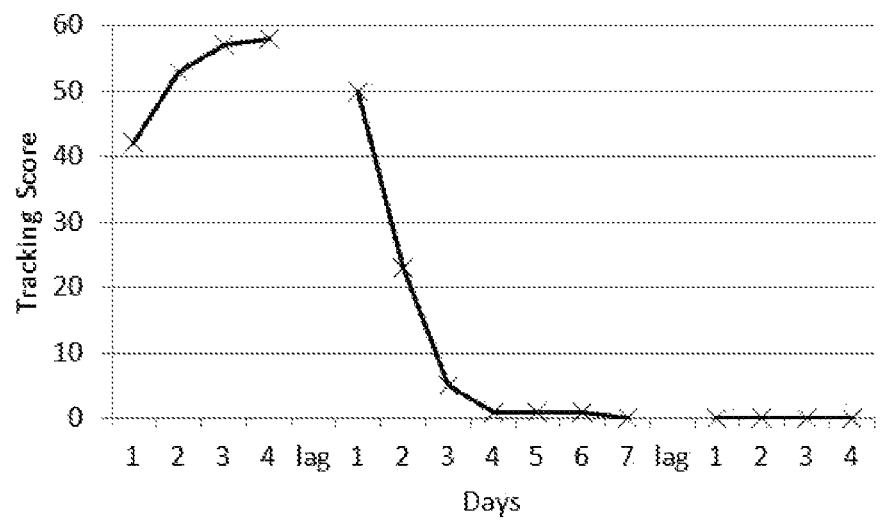
Fig. 2: Bait take as measured in gramms of taken bait by rats during the field test
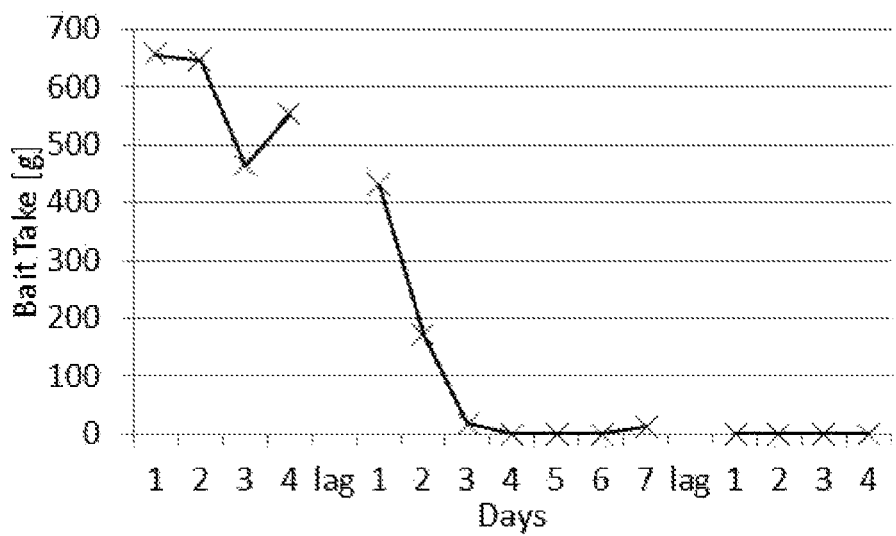

Fig. 3: Tracking Score (cf. Tables 4-6) indicating the mice population reduction
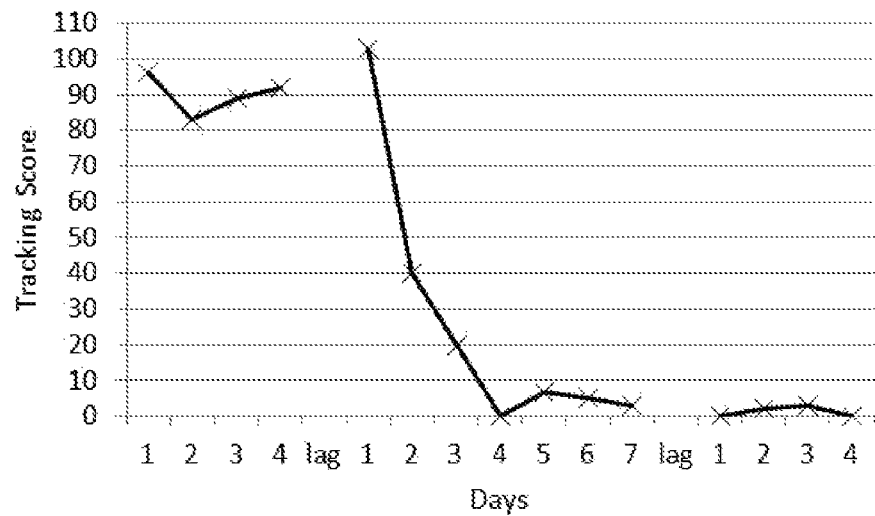
Fig. 4: Bait take as measured in gramms of taken bait by mice during the field test
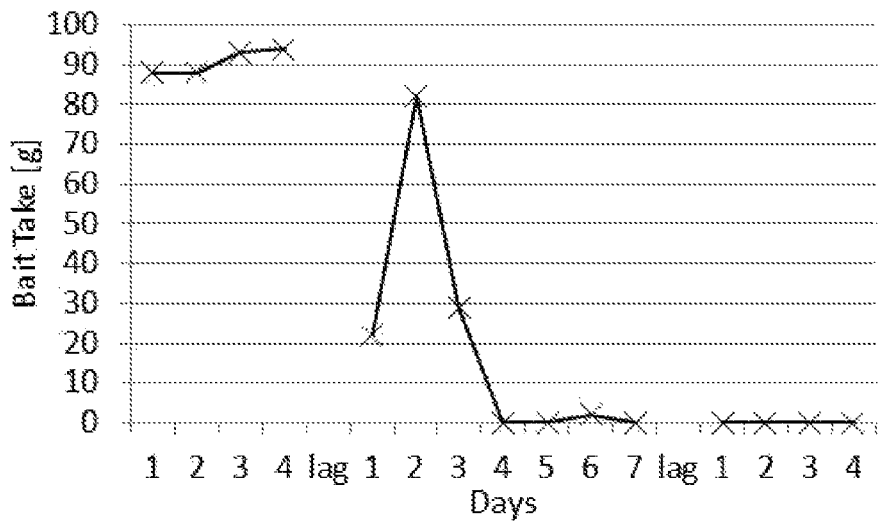

METHOD FOR CONTROLLING RATS AND MICE WITH CHOLECALCIFEROL BAITS

This application is a National Stage application of International Application No. PCT/EP2015/063071, filed Jun. 11, 2015. This application also claims priority under 35 U.S.C. § 119 to European Patent Application No. 14172586.1, filed Jun. 16, 2014; European Patent Application No. 15150811.6, filed Jan. 12, 2015; and European Patent Application No. 15152162.2, filed Jan. 22, 2015.

The present invention relates to a method for controlling undesired rats and mice comprising the steps of placing on a first day cholecalciferol baits at bait points in an environment to be protected and leaving the baits for a baiting time at the bait points, where the baiting time is less than 10 days for the control of mice and less than 15 days for the control of rats; or where the cholecalciferol baits are placed only on the first day of the baiting time and optionally on up to 3 further times within the baiting time in the environment to be protected. Combinations of preferred embodiments with other preferred embodiments are within the scope of the present invention.

Populations of rats and mice are controlled principally because of the economic damage they cause and the health risk associated to the fact that these rodents are carriers of human pathogens. Rats and mice are responsible for large scale food/feed consumption and spoilage and cause structural damage to buildings and other damage resulting from their habits of chewing and digging. Infestations by rats and mice are often controlled by the administration of poison formulations.

Cholecalciferol (Vitamin D3) is the key regulator of calcium homeostasis in the human and animal body. At toxic levels it induces hypercalcaemia, tissue calcification and heart failure, which can be used to control rodents. As a rodenticide, cholecalciferol has several advantages over anticoagulants, including a softer environmental profile, lower risk for birds (primary poisoning) and for predators (secondary poisoning). However, its efficacy in recent bait formulations was not convincing, due to its unfavourable taste, its anti-feedant effect and the development of bait-shyness in animals which ingested a sub-lethal dose.

Bait shyness for cholecalciferol is well known (Gould and Holmes, Pest Manag. Sci., 2008, 64, 197-202). Gould and Holmes tested N-methyl-D-aspartate receptor blocker dextromethorphan, which was shown to eliminate bait shyness of sodium fluoroacetat, but was ineffective in preventing it to cholecalciferol.

Kocher and Navjot (Int. J. Res. Biosci. 2013, 2, 73-82) recommend to take advantage of the synergistic effect of bromadiolone and cholecalciferol, and teach that " . . . cholecalciferol alone is also not suitable to control rat population, as it often shows the poor acceptance of bait".

Posipischil and Schnorbach (Proc. 16th Vertebr. Pest Conf., 1994, 180-187, "Racumin Plus, a new promising rodenticide against rats and mice") found that "0.1% cholecalciferol alone is also not suitable to control a rat population with only one day of feeding, and often the poor acceptance is a result of bait shyness" and that the percentage of cholecalciferol in a bait should be lower than "0.025% or even 0.01% to avoid bait shyness".

The product labels of commercial cholecalciferol products Terad$_3$® Blox from Bell Laboratories, USA or Agrid$_3$® Bait Chunx from Motomco, USA give applications directions for Norway rats and roof rats: "Maintain an uninterrupted supply of fresh bait for 10 days or until there no longer are signs of recent feeding on bait by rats", and for house mice: "Maintain an uninterrupted supply of fresh bait for 15 days or until there no longer are signs of recent feeding on bait by house mice."

Disadvantage of the known cholecalciferol baits is that they require a long application time of at least 10 days for rats and at least 15 days for mice, including a repeated replenishing and maintainace of the bait supply. This long application time may be due to the bait shyness caused by cholecalciferol.

Object of the present invention was to reduce the baiting time and to reduce the workload for continuous maintaining an uninterrupted bait supply.

FIG. 1 illustrates an overview of Tracking Score (cf. Tables 1-3) indicating rat population reduction.

FIG. 2 illustrates bait take (measured in grams of taken bait by rats) during field tests.

FIG. 3 illustrates Tracking Score (cf. Tables 4-6) indicating mice population reduction.

FIG. 4 illustrates bait take (measured in grams of taken bait by mice) during field tests.

The objects were achieved with a method for controlling undesired rats and mice comprising the steps of placing on a first day cholecalciferol baits at bait points in an environment to be protected and leaving the baits for a baiting time at the bait points,
  a) where the baiting time is less than 15 days for the control of mice and less than 10 days for the control of rats; or
  b) where the cholecalciferol baits are placed only on the first day of the baiting time and optionally on up to 3 further times within the baiting time in the environment to be protected.

In an embodiment the method for controlling undesired rats and mice comprises the steps of placing on a first day cholecalciferol baits at bait points in an environment to be protected and leaving the baits for a baiting time at the bait points, where the baiting time is less than 15 days for the control of mice and less than 10 days for the control of rats.

In another embodiment the method for controlling undesired rats and mice comprises the steps of placing on a first day cholecalciferol baits at bait points in an environment to be protected and leaving the baits for a baiting time at the bait points, where the cholecalciferol baits are placed only on the first day of the baiting time and optionally on up to 3 further times within the baiting time in the environment to be protected. In a preferred embodiment the method for controlling undesired rats and mice comprises the steps of placing on a first day cholecalciferol baits at bait points in an environment to be protected and leaving the baits for a baiting time at the bait points, where the cholecalciferol baits are placed only on the first day in the environment to be protected.

In another form the method for controlling undesired rats and mice comprises the steps of placing on a first day cholecalciferol baits at bait points in an environment to be protected and leaving the baits for a baiting time at the bait points, where the baiting time is less than 15 days for the control of mice and less than 10 days for the control of rats; and where the cholecalciferol baits are placed only on the first day of the baiting time and optionally on up to 3 further times within the baiting time in the environment to be protected.

Examples for rats are those animals of the genera *Rattus*, such as *R. rattus* and *R. norvegicus*.

Examples for mice are those animals of the genera *Mus*, such as *Mus musculus*. The method according to the invention allows the control of either rats or of mice, or of both rats and mice simultaneously.

The cholecalciferol baits are placed at bait points in an environment to be protected. Usually the baits are set up in such a way that the environment undergoes only a minimum of alteration.

Examples of environment to be protected are agricultural, domestic, or commercial premises or rural sites.

Agricultural premises are installations which have agricultural, silvicultural or horticultural character and/or serve for the production, processing, storage, sale of agricultural products, including feedstuffs, and/or where animals are kept. Examples of agricultural premises are those where animals are kept as the main business, as a second source of income or noncommercially. Animal keeping may be, for example, a closed, semi-open or open building or built-up area where, for example, horses, goats, cattle, pigs, sheep or poultry are kept. Further examples of agricultural premises preferred are premises on which feedstuffs are located. Feed stores are, for example, feed silos, feed blenders, piles or silos of cereals, cereal blenders, tubs in which feed is stored, and the like. On agricultural premises often buildings are to be protected, such as dwellings, stores, animal houses, workshops, sheds, garages, barns or the like. Further examples of agricultural premises comprise straw/hay (for example, piles of straw or piles of hay consisting of loose or bound straw or hay, also in barns or haystacks); or groundcover plants (for example shrubs which cover the ground densely and thus offer protection for undesired rats and mice); stacks (such as arranged stacks of timber, stacks of building materials, firewood and the like), piles of old materials (junk) (e.g. unarranged piles of pipes, tires, old building materials and the like.

The cholecalciferol baits are placed at bait points in an environment to be protected. An expert may select suitable bait points based on his experience.

For controlling rats usually 1 to 30 (preferably 2 to 20 and in particular 2 to 10) cholecalciferol baits are placed at each bait point.

For controlling rats usually a total amount of cholecalciferol baits from 10 to 500 g (preferably 15 to 300 g and in particular 15 to 200 g) are placed at each bait point.

For controlling rats the bait points usually are located in intervals of 1 to 25 m, preferably of 3 to 15 m, and in particular of 5 to 10 m.

For controlling rats preferably 1 to 30 cholecalciferol baits are placed at each bait point, and where the bait points are located in intervals of 5 to 10 m, and optionally a total amount of cholecalciferol baits from 15 to 200 g are placed at each bait point.

For controlling mice usually 1 to 10 (preferably 1 to 4 and in particular 1 to 2 cholecalciferol baits are placed at each bait point.

For controlling mice usually a total amount of cholecalciferol baits from 10 to 100 g (preferably 15 to 70 g and in particular 15 to 50 g) are placed at each bait point.

For controlling mice the bait points usually are located in intervals of 0.3 to 10 m, preferably of 0.5 to 3 m, and in particular of 1 to 2 m.

For controlling mice preferably 1 to 3 cholecalciferol baits are placed at each bait point, and the bait points are located in intervals of 1 to 2 m, and optionally a total amount of cholecalciferol baits from 15 to 50 g are placed at each bait point.

In one form the cholecalciferol baits are usually left for a baiting time at the bait points, where the baiting time is less than 15 days (such as less than 14, 13, 12, 11, 10, 9, 8 or 7 days), for the control of mice and less than 10 days (such as less than 9, 8, 7, 6, 5, 4, or 3 days) for the control of rats.

Leaving the baits for a baiting time at the bait points usually means that the baits are offered to the rats or mice during the baiting time, and that the baits are not removed on purpose by any person.

In another form the cholecalciferol baits are placed only once on the first day of the baiting time or optionally on up to 3 further times (e.g. 1 or 2 times) within the baiting time in the environment to be protected. Preferably, the cholecalciferol baits are placed only once on the first day of the baiting time in the environment to be protected.

The method according to the invention may reduce the number of rats or mice at least 70%, preferably at least 80%, and in particular at least 90% in the environment to be protected at the end of the baiting time. This efficacy evaluation may be done as described in European Directive 98/8/EC concerning the placing of biocidal products on the market "Technical Notes for Guidance on Product Evaluation, Appendices to Chapter 7, Product Type 14 Efficacy Evaluation of Rodenticidal Biocidal Products". The reduced number refers to the number of rats, mice, or both, depending on the genus to be controlled The degree of control of the undesired rats and mice may be assessed by c) replenishing consumed cholecalciferol baits at the end of the baiting time by control baits, which contain or are free of a rodenticide, d) leaving the control baits for a control time of less than 10 days (preferably less than 6 days, and in particular less than 4 days) at the bait points, and e) analysing at the end of the control time the number of consumed control baits.

The term "consumed cholecalciferol baits" may refer to cholecalciferol baits which are partly or fully consumed by rats or mice.

The term "free of a rodenticide" may refer to control baits which are free of cholecalciferol.

When the number of consumed control baits is less than 20% (preferably less than 10%, or in particular less than 5%) of the total number of control baits and cholecalciferol baits present in step c), then all remaining cholecalciferol baits (such as those which were not or only partly consumed) and optionally all control baits may be removed from the bait points.

The cholecalciferol baits may have a palatability of at least 2.0, preferably of at least 2.5, more preferably of at least 3.0, and in particular of at least 4.0.

The palatability may be determined by the weight ratio between a total test bait take and a total control diet take, e.g. in a group of five animals. Thus, a palatability of >1.0 indicates that the test bait was more palatable to the rats than the control diet whereas a palatability ratio of 1.0 indicates that the test bait and the control diet were equally palatable.

A suitable palatability test is describe by BPR, Regulation (EU) number 528/2012, "Technical Notes for Guidance on Product Evaluation, Appendices to Chapter 7, Product Type 14 Efficacy Evaluation of Rodenticidal Biocidal Products".

The cholecalciferol baits may have a weight of 1 to 50 g each. Preferably, the cholecalciferol baits have a weight of 5 to 35 g and in particular 15 to 25 g.

The cholecalciferol baits may have a block like shape. The length, height and width of the block may be each 1 to 10 cm, preferably 1.5 to 6 cm, and in particular 2 to 5 cm. The term "soft bait" may related to a bait that is formulated so as to have a paste-like consistency, i.e. to yield readily to touch or pressure and be deformable. Preferably, the soft bait composition has the property of plasticity. The soft bait is usually a viscous material comprising a dispersion of fine particulate solids in fat which is capable of being moulded or shaped.

In another form the cholecalciferol baits may comprise less than 5.0 wt % (preferably less than 1.0 wt %, and in particular less than 0.2 wt %) paraffin wax. In another form the cholecalciferol baits may be essentially free of paraffin wax. Paraffin waxes may be used as binders or to improve weather resistance. However, they may lower palatability. Paraffin waxes are typically alkane hydrocarbons (preferably with the general formula CnH2n+2, wherein n is from 15 to 45), which are solid at 25° C. The melting point of the paraffin waxes are usually above 40° C. (preferably above 55° C.).

The cholecalciferol bait will typically comprise 250-10000 ppm cholecalciferol (i.e. 0.025-1.0% by weight based on the total weight of the bait), such as 400, 500, 600, 700, 750, 800 or 900 ppm. In a preferred form the cholecalciferol bait will comprise 750 ppm cholecalciferol.

In another form the cholecalciferol bait typically comprises 250 to 5000 ppm cholecalciferol, preferably 400 to 3000 ppm, more preferably 500 to 2000 ppm, and in particular 600 to 1000 ppm.

The cholecalciferol baits may comprise a further rodenticide in addition to cholecalciferol. Suitable further rodenticides may be selected from following classes of rodenticides:
- anticoagulants, in particular coumarin derivatives such as brodifacoum, bromadiolone, coumachlor, coumafuryl, coumatetralyl, difenacoum, difethialone, flocoumafen and warfarin, indandione derivatives such as chlorophacinone, diphacinone and pindone;
- inorganic rodenticides such as arsenic oxide, phosphorus, potassium arsenite, sodium arsenite, thallium sulfate and zinc phosphide;
- organochlorine rodenticides such as γ-HCH, HCH and lindan;
- organophosphorus rodenticides such as phosacetim;
- pyrimidineamine rodenticides such as crimidine;
- thiourea rodenticides such as antu;
- urea rodenticides such as pyrinuron;
- garden rodenticides such as scilliroside and strychnine;
- unclassified rodenticides such as bromethalin, chloralose, α-chlorohydrin, fluroroacetamide, flupropadine, norbormide, alphachloralose, sodium fluoroacetate.

Preferably the cholecalciferol baits are free of further rodenticides.

In another preferred form the cholecalciferol bait is a soft bait and comprises cholecalciferol, a fat, a vegetable flour, and optionally an edible seed.

In another preferred form the cholecalciferol bait comprises cholecalciferol, not more than 25 wt % of the fat, at least 60 wt % of the vegetable flour, and optionally 0,05 to 5 wt % of the edible seed.

In another preferred form the cholecalciferol baits is a soft bait and comprises vegetable flour, a fat which is not completely liquid at a temperature of 35° C. and cholecalciferol wherein the vegetable flour is present in an amount of at least 60% by weight based on the total weight of the bait and wherein the weight ratio of vegetable flour to fat is 4:1 to 8:1.

The cholecalciferol bait may comprise one or more vegetable flour. The vegetable flour will be a cereal flour or a non-cereal flour. Examples of suitable vegetable flours include cereal flours such as oat flour, wheat flour, rice flour and maize flour and non-cereal flours such as potato flour, peanut flour and soy flour. Preferably, the vegetable flour will be oat flour or a mixture of oat flour and wheat flour. Oat flour has a taste which is particularly attractive to rodents, especially rats. If a mixture of oat flour and wheat flour is used as the vegetable flour in the cholecalciferol bait, the content of the wheat flour in the mixture will typically not exceed about 30% by weight based on the combined weight of the oat flour and wheat flour.

Preferably, if the vegetable flour used consists of oat flour and wheat flour, the wheat flour will be used in an amount not exceeding 15% by weight based on the combined weight of the oat flour and wheat flour. The cholecalciferol bait may contain the vegetable flour, as described above, in an amount which is at least 60% by weight based on the total weight of the cholecalciferol bait. According to a preferred embodiment, the vegetable flour as described above is present in an amount not greater than 80% by weight based on the total weight of the cholecalciferol bait. More preferably, the vegetable flour as described above, will be used in an amount of from 62 to 78% by weight based on the total weight of the cholecalciferol bait.

The fat (preferably an edible fat) may be an animal fat or a vegetable fat or may be a combination of animal and vegetable fats. According to one embodiment, the fat may be one which is not completely liquid at a temperature of 35° C. The cholecalciferol bait may contain a fat which is not completely liquid at a temperature of 35° C., i.e. it is solid at normal room temperature (20° C.) but is not completely melted at 35° C. The fat may be an animal fat or a vegetable fat. Preferably, the fat is a vegetable fat and, more preferably, is refined palm oil. At a temperature of 35° C., refined palm oil contains a liquid (olein) fraction and a solid (stearin) fraction. Typically, the fat, preferably palm oil, content of the soft bait composition is not greater than 25% by weight based on the total weight of the cholecalciferol bait. Preferably, the fat, preferably palm oil, content of the soft bait composition is not greater than 15% by weight based on the total weight of the cholecalciferol bait. More preferably, the cholecalciferol bait contains between 10 and 13% by weight of fat, preferably refined palm oil, based on the total weight of the cholecalciferol bait.

Preferably the weight ratio of vegetable flour to fat is within the range of 4:1 to 8:1. Preferably, the weight ratio of vegetable flour to fat is 5:1 to 7.5:1. According to a preferred embodiment, the cholecalciferol bait contains a vegetable flour selected from oat flour, wheat flour and mixtures thereof and deodorized, refined palm oil wherein the weight ratio of the vegetable flour to palm oil is 6:1 to 7:1.

Preferably, the cholecalciferol bait contains edible seeds. Examples of edible seeds that can be used in the soft bait composition of the invention will typically be ones that are less than 1 mm in length. Preferably, the edible seed is poppy seed since poppy seed is particularly palatable to rodents, especially rats. The amount of edible seed in the soft bait composition of the invention is typically in the range of from 0,05 to 5% by weight based on the total weight of the cholecalciferol bait. The amount of edible seed in the soft bait composition of the invention is preferably in the range of from 0,1 to 1% by weight based on the total weight of the cholecalciferol bait. According to a preferred embodiment, the cholecalciferol bait contains about 0.5% by weight of poppy seed based on the total weight of the composition.

According to a preferred embodiment, the cholecalciferol bait comprises oat flour, refined palm oil and, cholecalciferol wherein the oat flour is present in an amount of at least 60% by weight based on the total weight of the composition and wherein the weight ratio of oat flour to refined palm oil is from 5:1 to 6:1.

According to a more preferred embodiment, the cholecalciferol bait comprises about 0.075% by weight of cholecalciferol, about 10.0% by weight of wheat flour, about 11.5% by weight of refined, deodorised palm oil and about 64% by weight of oat flour, all percentages being based on the total weight of the composition.

The cholecalciferol bait may, advantageously, also contain one or more components such as sweetening agents, vegetable oil, additional food components, pigments or dyes, flavouring agents, preservatives, antioxidants, fungistats and taste deterrents. Such additional components are well known to the person skilled in the art.

Preferably, the cholecalciferol bait contains a sweetening agent. Typically, the sweetening agent is sucrose, preferably icing sugar. According to an embodiment, the cholecalciferol bait contains from 10 to 15% by weight, preferably about 10% by weight, of sucrose, preferably icing sugar, based on the total weight of the composition.

It is conventional, in the art of rodenticides, to include one or more substances which act as a deterrent to humans. Such substances typically provide a flavour which is repellent to humans. Typical of such substances are bittering substances which give a bait an unpleasant taste noticeable to humans. An example of such a taste deterrent is denatonium benzoate. Such deterrent substances may be included in a total amount which is typically about 0.001% by weight based on the total weight of the cholecalciferol bait.

The cholecalciferol bait will typically be coloured, by the incorporation of a colourant, e.g. a dye or pigment, to aid identification. Typically, a colourant will be present in an amount of about 0.002% by weight based on the total weight of the composition.

The cholecalciferol bait may be enrobed in a thermoplastic film or paper, which are optionally perforated. Preferably the cholecalciferol bait may be enrobed in a thermoplastic film which is optionally perforated. Preferably, the thermoplastic film comprises one or more polyolefins, typically selected from polyethylene, polypropylene and copolymers of ethylene and polypropylene. The thermoplastic film may be a monolayer film or a multi-layer film. Multi-layer polyolefin films are well-known in the art and typically comprise a "core" layer and a "skin" layer on each side of the "core" layer. The "core" layer may comprise a polymeric blend, the major constituent of which blend being either a homopolymer or copolymer of ethylene and a minor constituent being either a homopolymer or copolymer of butylene. The "skin" layers typically comprise a homopolymer of ethylene or of propylene or a copolymer of ethylene and propylene. Preferably, the film, whether a monolayer film or a multi-layer film, is oriented so that it is heat-shrinkable in at least one direction. The use of a shrink film makes it possible to shrink the film around the bait composition so that the bait composition is tightly enclosed or wrapped within the film.

Thermoplastic films are commercially available in a variety of film thicknesses. Typical thickness ranges from 13 to 25 μm. We have found that packaged baits manufactured using perforated polyolefin film having a film thickness of 19 μm have good palatability characteristics for rodents. Films having a thickness of 25 μm are acceptable but have a lower palatability for rats compared to films of 19 μm thickness.

The thermoplastic film used may be perforated. Pre-perforated films are well known in the art. The perforations in the film allow aromas, from the bait composition, to escape so that they act as feeding stimulants for the target rodents and, thus, increase the palatability of the bait. The hole diameters are, however, too small to allow the bait composition or components thereof to escape. By the term "perforations" we mean a plurality of deliberately-created small holes in the film. The perforations are preferably provided in the film forming the walls of the packaged bait in a uniform manner, i.e. each perforation is spaced substantially equidistant from its neighbouring holes, so as to optimise the escape of aroma from the packaged bait.

Typically, the perforated thermoplastic film contains 100 to 300 perforations per square decimetre, preferably from 150 to 250 perforations per square decimetre. We have found that the use of a multi-layer coextruded polyolefin shrink film having a uniform perforation of about 200 perforations per square decimetre enables the manufacture of a packaged bait which has excellent performance in allowing aroma escape and, therefore, ensuring good palatability for rodents. The perforated thermoplastic film will have good resistance to wear and tear and have good resistance to environmental conditions of heat and light. Such perforated thermoplastic films are easily available commercially.

In a preferred form the method for controlling undesired rats and mice comprises the steps of placing on a first day cholecalciferol baits at bait points in an environment to be protected and leaving the baits for a baiting time at the bait points,
  a) where the baiting time is less than 15 days (such as less than 14, 13, 12, 11, 10, 9, 8 or 7 days) for the control of mice and less than 10 days (such as less than 9, 8, 7, 6, 5, 4, or 3 days) for the control of rats; and
  where the cholecalciferol baits have a weight of 5 to 50 g each; and
  where the cholecalciferol baits are free of further rodenticides; and
  wherein for controlling mice 1 to 3 cholecalciferol baits are placed at each bait point, and the bait points are located in intervals of 1 to 2 m, and a total amount of cholecalciferol baits from 15 to 50 g are placed at each bait point; and
  wherein for controlling rats preferably 1 to 30 cholecalciferol baits are placed at each bait point, and where the bait points are located in intervals of 5 to 10 m, and a total amount of cholecalciferol baits from 15 to 200 g are placed at each bait point.

In a preferred form the method for controlling undesired rats and mice comprises the steps of placing on a first day cholecalciferol baits at bait points in an environment to be protected and leaving the baits for a baiting time at the bait points,
  b) where the cholecalciferol baits are placed only on the first day of the baiting time and optionally on up to 3 further times within the baiting time in the environment to be protected; and
  where the cholecalciferol baits have a weight of 5 to 50 g each; and
  where the cholecalciferol baits are free of further rodenticides; and
  wherein for controlling mice 1 to 3 cholecalciferol baits are placed at each bait point, and the bait points are located in intervals of 1 to 2 m, and a total amount of cholecalciferol baits from 15 to 50 g are placed at each bait point; and
  wherein for controlling rats preferably 1 to 30 cholecalciferol baits are placed at each bait point, and where the bait points are located in intervals of 5 to 10 m, and a total amount of cholecalciferol baits from 15 to 200 g are placed at each bait point.

In another preferred form the method for controlling undesired rats and mice comprises the steps of placing on a first day cholecalciferol baits at bait points in an environment to be protected and leaving the baits for a baiting time at the bait points,
- a) where the baiting time is less than 15 days (such as less than 14, 13, 12, 11, 10, 9, 8 or 7 days) for the control of mice and less than 10 days (such as less than 9, 8, 7, 6, 5, 4, or 3 days) for the control of rats; and
- where the cholecalciferol baits have a weight of 5 to 50 g each; and
- where the cholecalciferol baits are free of further rodenticides; and
- where the cholecalciferol bait is a soft bait and comprises cholecalciferol, a fat, an vegetable flour, and optionally an edible seed; and
- wherein for controlling mice 1 to 3 cholecalciferol baits are placed at each bait point, and the bait points are located in intervals of 1 to 2 m, and a total amount of cholecalciferol baits from 15 to 50 g are placed at each bait point; and
- wherein for controlling rats preferably 1 to 30 cholecalciferol baits are placed at each bait point, and where the bait points are located in intervals of 5 to 10 m, and a total amount of cholecalciferol baits from 15 to 200 g are placed at each bait point.

In another preferred form the method for controlling undesired rats and mice comprises the steps of placing on a first day cholecalciferol baits at bait points in an environment to be protected and leaving the baits for a baiting time at the bait points,
- b) where the cholecalciferol baits are placed only on the first day of the baiting time and optionally on up to 3 further times within the baiting time in the environment to be protected; and
- where the cholecalciferol baits have a weight of 5 to 50 g each; and
- where the cholecalciferol baits are free of further rodenticides; and
- where the cholecalciferol bait is a soft bait and comprises cholecalciferol, a fat, an vegetable flour, and optionally an edible seed; and
- wherein for controlling mice 1 to 3 cholecalciferol baits are placed at each bait point, and the bait points are located in intervals of 1 to 2 m, and a total amount of cholecalciferol baits from 15 to 50 g are placed at each bait point; and
- wherein for controlling rats preferably 1 to 30 cholecalciferol baits are placed at each bait point, and where the bait points are located in intervals of 5 to 10 m, and a total amount of cholecalciferol baits from 15 to 200 g are placed at each bait point.

In another preferred form the method for controlling undesired rats and mice comprises the steps of placing on a first day cholecalciferol baits at bait points in an environment to be protected and leaving the baits for a baiting time at the bait points,
- a) where the baiting time is less than 15 days (such as less than 14, 13, 12, 11, 10, 9, 8 or 7 days) for the control of mice and less than 10 days (such as less than 9, 8, 7, 6, 5, 4, or 3 days) for the control of rats; and
- where the cholecalciferol baits have a weight of 5 to 50 g each; and
- where the cholecalciferol baits are free of further rodenticides; and
- where the cholecalciferol baits is a soft bait and comprises vegetable flour, a fat which is not completely liquid at a temperature of 35° C. and cholecalciferol wherein the vegetable flour is present in an amount of at least 60% by weight based on the total weight and wherein the weight ratio of vegetable flour to fat is 4:1 to 8:1; and
- wherein for controlling mice 1 to 3 cholecalciferol baits are placed at each bait point, and the bait points are located in intervals of 1 to 2 m, and a total amount of cholecalciferol baits from 15 to 50 g are placed at each bait point; and
- wherein for controlling rats preferably 1 to 30 cholecalciferol baits are placed at each bait point, and where the bait points are located in intervals of 5 to 10 m, and a total amount of cholecalciferol baits from 15 to 200 g are placed at each bait point.

In another preferred form the method for controlling undesired rats and mice comprises the steps of placing on a first day cholecalciferol baits at bait points in an environment to be protected and leaving the baits for a baiting time at the bait points,
- b) where the cholecalciferol baits are placed only on the first day of the baiting time and optionally on up to 3 further times within the baiting time in the environment to be protected; and
- where the cholecalciferol baits have a weight of 5 to 50 g each; and
- where the cholecalciferol baits are free of further rodenticides; and
- where the cholecalciferol baits is a soft bait and comprises vegetable flour, a fat which is not completely liquid at a temperature of 35° C. and cholecalciferol wherein the vegetable flour is present in an amount of at least 60% by weight based on the total weight and wherein the weight ratio of vegetable flour to fat is 4:1 to 8:1; and
- wherein for controlling mice 1 to 3 cholecalciferol baits are placed at each bait point, and the bait points are located in intervals of 1 to 2 m, and a total amount of cholecalciferol baits from 15 to 50 g are placed at each bait point; and wherein for controlling rats preferably 1 to 30 cholecalciferol baits are placed at each bait point, and where the bait points are located in intervals of 5 to 10 m, and a total amount of cholecalciferol baits from 15 to 200 g are placed at each bait point.

All cholecalciferol baits and optionally all control baits are usually removed from the bait points at the end of the baiting time, or at the end of the control time.

The method according to the invention offers various advantages: It is highly effective against rats and mice, even against all anticoagulant resistant rats and mice; it allows a quicker killing, e.g. compared to anticoagulants, therefore it reduces the damage and the risk of infections; there is a lower poisoning risk to birds or to predators; it is less harmful to the environment; the quicker control of infestations reduces time and effort for the pest controller.

The examples which follow illustrate the invention without imposing any limitation.

EXAMPLES

Field Test for the Control of Rats

The methodology used complied with that stated in European Directive 98/8/EC concerning the placing of biocidal products on the market "Technical Notes for Guidance on Product Evaluation, Appendices to Chapter 7, Product Type 14 Efficacy Evaluation of Rodenticidal Biocidal Products". A conventional surplus baiting method was used. The site was a retail business in an industrial area situated. The building was constructed of timber, tin sheeting, block and steel.

Pre-trial Survey:

The trial site was systematically surveyed for evidence of infestation. Rats that were observed were visually identified as Rattus norvegicus. Sketch plans of the site were prepared on which the positions of the census diet and any tracking patches and bait points were marked.

Pre-Treatment Census:

Thirty-two tracking patches (lightly coated with horticultural silver sand) and 32 pre-census diet points, consisting of 200 g whole wheat were used for the pre-treatment census. For four consecutive days the residual wheat in each tray was inspected, weighed to the nearest 1.0 g on a portable electronic balance and, where a measurable take had occurred, replenished to an amount sufficient to provide a surplus until the next visit 24 h later. The amount taken by the rats was recorded. Marks on the tracking patches were recorded on an arbitrary scale, erased, and the patches re-coated. The pre-census results (Table 1) indicated the presence of what is considered to be considered a medium level of infestation for an urban environment. Assuming a census diet take of 10 g per rat per day, the maximum pre-treatment census diet take of 656 g indicated an infestation of ca. 66 rats; the mean pre-treatment census diet take indicated an infestation of ca. 58 rats.

TABLE 1

Pre-Treatment Census

| | Pre-Census Diet | | Tracking Indices | |
|---|---|---|---|---|
| Day | Diet Take [g] | Active Points | Score | Active Tiles |
| 1 | 656 | 23/32 | 42 | 24/32 |
| 2 | 647 | 23/32 | 53 | 26/32 |
| 3 | 465 | 22/32 | 57 | 23/32 |
| 4 | 555 | 28/32 | 58 | 23/32 |
| Total | 2323 | 96/128 | 210 | 96/128 |
| Mean | 581 | 24/32 | 53 | 24/32 |

Pre-Treatment Lag Period:

The pre-treatment census was followed by a pre-treatment lag period of ten days. During this period no census diet or bait was available on site and no observations were made on the infestations.

Treatment Period:

The treatment was carried out on Cholecalciferol Bait A (prepared as in Example 2 of the copending PCT/EP2014/055816, each block had a weight of about 17 g, a size of 4×3×3 cm and was packaged into single dosage perforated polyethylene sachets) using a conventional surplus baiting technique. The bait trays, each containing approximately 150 g (9 blocks) of the bait, were laid in protected situations sited strategically ca. 5-10 m apart throughout the infested areas. A total of 36 bait points were laid at the site on the first day. The following day the baits were checked visually for takes, weighed to the nearest 1.0 g, and replenished to an amount sufficient to avoid any subsequent complete bait takes. Similar observations and recordings were made for 7 days, with no more than 72 hours between visits. After the day 7 recordings the bait trays and bait were removed from the site. At each visit during the treatment period activity on the 32 tracking patches was recorded and each freshly coated with tracking powder, as during the pre-treatment census. The amount of taken bait and the tracking scores are summarized in Table 2.

The bait take reduced gradually from 431 g on day 1 of the treatment phase period to 171 g and 19 g on days 2 and 3 respectively. On days 4 to 6 no bait take was recorded. However, 13 g of bait take was recorded on day 7 indicating the presence of 1 or 2 rats. During the treatment period while bait take was reducing, the tracking score also reduced from 50 on day 1 to 0 on day 7. That is a 100% reduction in the level of rat activity during the bait treatment phase. It was decided to terminate the treatment phase after day 7 as the maximum control level that could be readily achieved had been achieved.

TABLE 2

Treatment

| | Treatment Bait | | Tracking Indices | |
|---|---|---|---|---|
| Day | Bait Take [g] | Active Points | Score | Active Tiles |
| 1 | 431 | 24/36 | 50 | 25/32 |
| 2 | 171 | 11/36 | 23 | 13/32 |
| 3 | 19 | 3/36 | 5 | 5/32 |
| 4 | 0 | 0/36 | 1 | 1/32 |
| 5 | 0 | 0/36 | 1 | 1/32 |
| 6 | 0 | 0/36 | 1 | 1/32 |
| 7 | 13 | 2/36 | 0 | 0/32 |
| Total | 634 | 40/252 | 210 | 46/224 |
| Mean | 91 | 6/36 | 30 | 7/32 |

Post-Treatment Lag Period:

The treatment period was followed by a 7 day lag period to enable any remaining rats a reasonable time in which to die, or recover, from any dose of rodenticide they may have ingested before beginning the post-treatment census.

Post-Treatment Census:

The census diet trays were returned to their original positions. The post-treatment census was conducted in exactly the same way as the pre-treatment census. The results are summarized in Table 3.

TABLE 3

Post - Treatment Census

| | Post-Census Diet | | Tracking Indices | |
|---|---|---|---|---|
| Day | Diet Take [g] | Active Points | Score | Active Tiles |
| 1 | 0 | 0/32 | 0 | 0/32 |
| 2 | 0 | 0/32 | 0 | 0/32 |
| 3 | 0 | 0/32 | 0 | 0/32 |
| 4 | 0 | 0/32 | 0 | 0/32 |
| Total | 0 | 0/128 | 0 | 0/128 |
| Mean | 0 | 0/32 | 0 | 0/32 |

Summary of the Results:

An overview of bait consumption and tracking activity is shown in FIGS. 1 and 2. The treatment resulted in a significant reduction of rat activity by day 7 of the treatment period. All the indices of treatment success based on the census diet and tracking data indicated 100% control. This degree of control is considered to be excellent for a sub-acute toxicant such as cholecalciferol. The results showed that the Cholecalciferol Bait A is an efficacious rodenticide bait.

Based on the field trial the baiting method according to the present invention is reasonably supported for the commercial application, e.g. by pest control professionals.

Field Test for the Control of Mice

The methodology used complied with that stated in European Directive 98/8/EC concerning the placing of biocidal products on the market "Technical Notes for Guidance on Product Evaluation, Appendices to Chapter 7, Product Type 14 Efficacy Evaluation of Rodenticidal Biocidal Products". A conventional surplus baiting method was used. The site was an urban commercial property.

Pre-Trial Survey:

The trial site was systematically surveyed for evidence of infestation. Mice that were observed were visually identified as Mus domesticus. Sketch plans of the site were prepared on which the positions of the census diet and any tracking patches and bait points were marked.

Pre-Treatment Census:

Tracking patches (100×100 mm, lightly coated with horticultural silver sand) and pre-census diet points (wooden bait trays, 75*90 mm), consisting of 30 g whole wheat were used for the pre-treatment census. For four consecutive days the residual wheat in each tray was inspected, weighed to the nearest 1.0 g on a portable electronic balance and, where a measurable take had occurred, replenished to an amount sufficient to provide a surplus until the next visit 24 h later. The amount taken by the mice was recorded. Marks on the tracking patches were recorded on an arbitrary scale, erased, and the patches re-coated. The pre-census results (Table 4) indicated the presence of what is considered to be considered a medium level of infestation for this environment. Assuming a census diet take of 2,5 g per mouse per day, the maximum pre-treatment census diet take of 94 g indicated an infestation of ca. 38 mice; the mean pre-treatment census diet take indicated an infestation of ca. 36 mice.

TABLE 4

Pre-Treatment Census

| Day | Pre-Census Diet Diet Take [g] | Tracking Indices Score |
|---|---|---|
| 1 | 88 | 96 |
| 2 | 88 | 83 |
| 3 | 93 | 89 |
| 4 | 94 | 92 |
| Total | 363 | 360 |
| Mean | 91 | 90 |

Pre-Treatment Lag Period:

The pre-treatment census was followed by a pre-treatment lag period of ten days. During this period no census diet or bait was available on site and no observations were made on the infestations.

Treatment Period:

The treatment was carried out on Cholecalciferol Bait A using a conventional surplus baiting technique. The bait trays, each containing approximately 35 g (2 blocks) of the bait, were laid in protected situations sited strategically ca. 1-2 m apart throughout the infested areas. A total of 53 bait points were laid at the site on the first day. The following day the baits were checked visually for takes, weighed to the nearest 1.0 g, and replenished to an amount sufficient to avoid any subsequent complete bait takes. Similar observations and recordings were made for 7 days, with no more than 72 hours between visits. After the day 7 recordings the bait trays and bait were removed from the site. At each visit during the treatment period activity on the tracking patches was recorded and each freshly coated with tracking powder, as during the pre-treatment census. The amount of taken bait and the tracking scores are summarized in Table 5.

TABLE 5

Treatment

| Day | Treatment Bait Bait Take [g] | Tracking Indices Score |
|---|---|---|
| 1 | 22 | 103 |
| 2 | 82 | 40 |
| 3 | 29 | 20 |
| 4 | 0 | 0 |
| 5 | 0 | 7 |
| 6 | 2 | 5 |
| 7 | 0 | 3 |
| Total | 135 | 178 |
| Mean | 19 | 25 |

Post-Treatment Lag Period:

The treatment period was followed by a 7 day lag period to enable any remaining mice a reasonable time in which to die, or recover, from any dose of rodenticide they may have ingested before beginning the post-treatment census.

Post-Treatment Census:

The census diet trays were returned to their original positions. The post-treatment census was conducted in exactly the same way as the pre-treatment census. The results are summarized in Table 6.

TABLE 6

Post - Treatment Census

| Day | Post-Census Diet Diet Take [g] | Tracking Indices Score |
|---|---|---|
| 1 | 0 | 0 |
| 2 | 0 | 2 |
| 3 | 0 | 3 |
| 4 | 0 | 0 |
| Total | 0 | 5 |
| Mean | 0 | 1 |

Summary of the Results:

An overview of bait consumption and tracking activity is shown in FIGS. 3 and 4. The treatment resulted in a significant reduction of mice activity by day 7 of the treatment period. All the indices of treatment success based on the census diet and tracking data indicated 99 to 100% control. This degree of control is considered to be excellent for a sub-acute toxicant such as cholecalciferol. The results showed that the Cholecalciferol Bait A is an efficacious rodenticide bait.

Based on the field trial the baiting method according to the present invention is reasonably supported for the commercial application, e.g. by pest control professionals.

We claim:

1. A method for controlling an infestation of undesired rats or mice in an environment to be protected comprising:
    placing on a first day cholecalciferol baits at bait points in the environment to be protected and leaving the baits for a baiting time at the bait points,
    wherein the baiting time is 7 days or less;
    wherein the cholecalciferol baits are placed only on the first day of the baiting time and optionally on up to 3 further times within the baiting time in the environment to be protected;

wherein the cholecalciferol bait comprises 600 to 1000 ppm of cholecalciferol;

wherein for controlling mice, 1 to 10 cholecalciferol baits are placed at each bait point and the bait points are located in intervals of 0.3 to 10 m;

wherein for controlling rats, 1 to 30 cholecalciferol baits are placed at each bait point and the bait points are located in intervals of 1 to 25 m;

wherein the cholecalciferol baits have a palatability of at least 2.0, wherein the method reduces the number of rats or mice by at least 90% in the environment to be protected at the end of the baiting time, and wherein the cholecalciferol bait is a soft bait and comprises cholecalciferol, a fat, a vegetable flour, and optionally an edible seed.

2. The method according to claim 1, where the cholecalciferol baits are placed only on the first day in the environment to be protected.

3. The method according to claim 1, where the cholecalciferol baits have a weight of 5 to 50 g each.

4. The method according to claim 1, where the cholecalciferol baits have a block like shape.

5. The method according to claim 3, where the block like shaped cholecalciferol bait has a length, height and width of each 1 to 10 cm, respectively.

6. The method according to claim 1, where the cholecalciferol baits are free of further rodenticides.

7. The method according to claim 1, where the cholecalciferol baits are soft baits.

8. The method according to claim 1, where the cholecalciferol baits are enrobed in paper or a thermoplastic film.

9. The method according to claim 7, where the cholecalciferol baits are enrobed in a perforated thermoplastic film.

10. The method according to claim 1, where the cholecalciferol bait comprises cholecalciferol, not more than 25 wt % of the fat, at least 60 wt % of the vegetable flour, and optionally 0.05 to 5 wt % of the edible seed.

11. The method according to claim 1, where for controlling mice 1 to 3 cholecalciferol baits are placed at each bait point, the bait points are located in intervals of 1 to 2 m, and a total amount of cholecalciferol baits from 15 to 70 g are placed at each bait point.

12. The method according to claim 1, where for controlling rats 2 to 20 cholecalciferol baits are placed at each bait point, the bait points are located in intervals of 5 to 10 m, and a total amount of cholecalciferol baits from 15 to 300 g are placed at each bait point.

* * * * *